Nov. 9, 1943.  C. J. CLARK  2,333,985
CONTOUR GRINDING MACHINE
Filed June 18, 1942
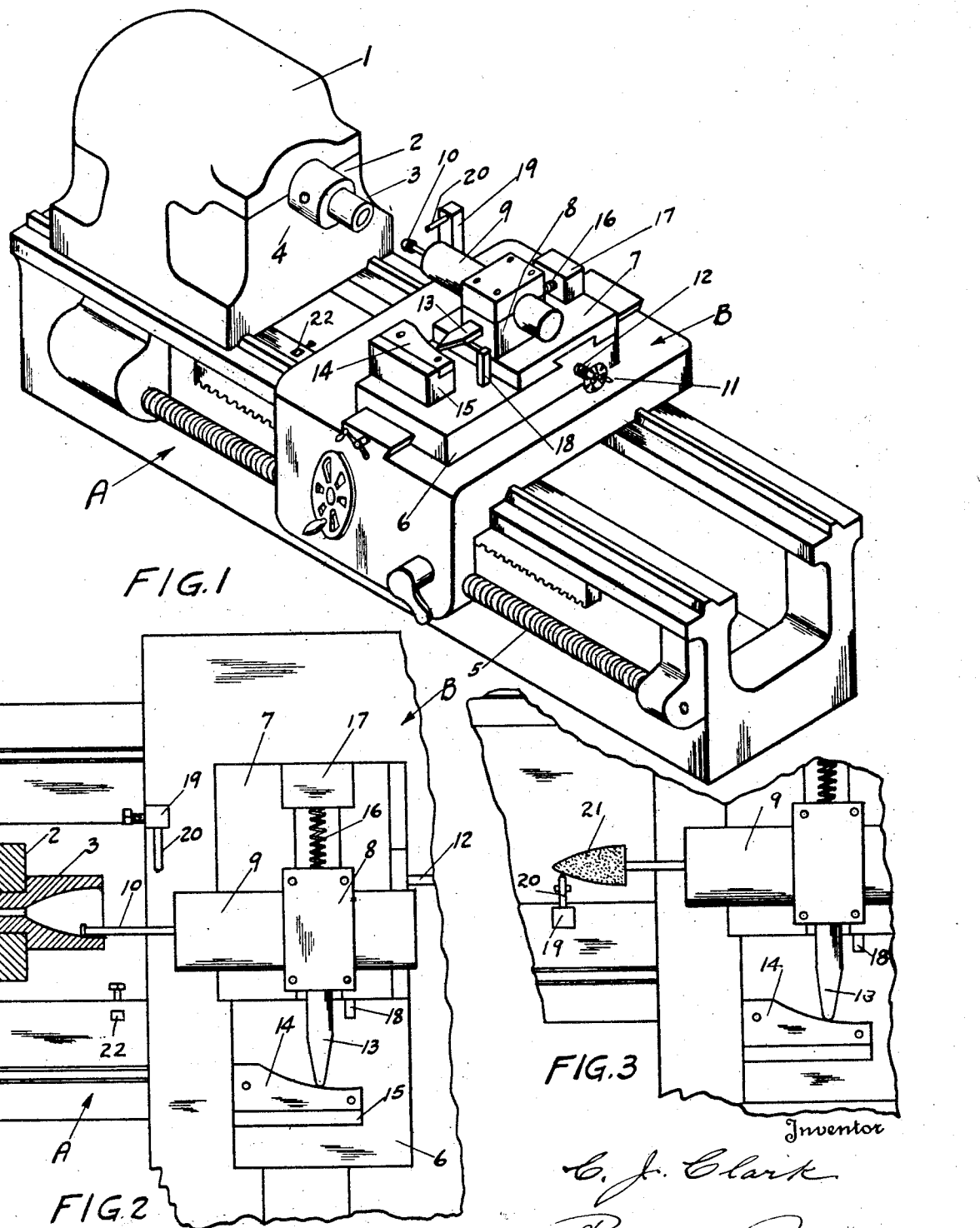

Patented Nov. 9, 1943

2,333,985

UNITED STATES PATENT OFFICE 2,333,985

CONTOUR GRINDING MACHINE

Charles J. Clark, Lakewood, Ohio

Application June 18, 1942, Serial No. 447,561

2 Claims. (Cl. 51—100)

The object of this invention has been to devise a simple and efficient type of attachment means or device adapted to be applied to, or used in connection with, a lathe, and designed particularly for grinding parts according to predetermined contours either internally or externally thereof.

In the preferred embodiment of my invention I have shown my invention as adapted for the grinding of the internal bore of a die such as may commonly be employed in a punch press, as for example for the purpose of forming bullets or the like.

My invention lies especialy in adapting of the lathe for the purposes of grinding parts such as mentioned by the application to the lathe of a special arrangement of cross and longitudinal slide members carried by the lathe saddle or carriage, the grinding means being moved bodily with one of the slide members on the carriage in feeding the grinding tool to the work, and being adapted for sidewise movement through automatic coaction of a tracer finger or arm operating on a templet or cam which establishes the required contour ground by the grinding element or tool as it is moved into or against the die or similar part required to be finished accurately to the said contour.

One of the embodiments of my invention is illustrated in the machine shown in the accompanying drawing, in which:

Figure 1 is a perspective view of the general machine and the parts utilized as the attachment feature thereof for accomplishing the purposes of the invention.

Figure 2 is a partial top plan view showing more particularly the grinding unit itself and the manner in which the grinding tool or wheel operates in the hollow die which is shown in cross section, said die being mounted upon the headstock of the lathe, the contour grinding devices being also generally illustrated.

Figure 3 is a fragmentary view showing a modified form of grinding wheel used in conjunction with the machine of my invention.

Referring to the accompanying drawing, I have illustrtaed, generally speaking, an ordinary type of lathe including the base or frame A upon which is supported the usual headstock 1 having mounted therein the rotative spindle 2. The spindle 2 is adapted to carry the work 3 which may be secured in place on the spindle by means of a suitable screw 4 or the like, so that the work will be rotated with the spindle in the operation of the latter.

The lathe frame or bed A has mounted thereon a longitudinally movable saddle or carriage B which may be of the customary type and which is adapted to be fed toward and from the headstock 1 by means of the operating screw 5. Upon the saddle B is carried the main cross slide 6 which in turn supports the longitudinal slide 7 movable crosswise of the slide 6, but longitudinally of the frame or bed A. Mounted upon the secondary slide 7 is another grinding tool supporting cross-slide 8 which is shiftable transversely of the slide 7 and in the same general direction as the slide 6.

Carried by the slide 8 is a grinder attachment of the type generally known as the Dumore grinder, and the same is comprised of the rigidly mounted motor 9 comprising tool holding means, by which is carried and driven the grinding tool 10, which in this instance is a grinding wheel. A suitable handle 11 is adapted to be manipulated to operate a screw feed member 12 for shifting the secondary slide 7 longitudinally of the machine toward and from the work or die 3.

Offstanding from a side of the slide 8 is the tracer arm or finger 13, the free end of which is adapted to contact with and follow the contour of the cam or templet 14 which is removably emplaced upon a grooved supporting block 15 rigidly carried by the main cross slide 6 and spaced a suitable distance from the grinding supporting slide 8.

According to the invention as illustrated there is shown in position upon the headstock spindle 2 a bullet die 3, which is the work to be ground to final contour and which is preliminarily hollowed or ground out before being subjected to the final contour grinding by the machine of this invention. The die 3 illustrated is the female die of the customary pair of dies employed in connection with punching machines to punch out and extrude or draw the metal for forming the bullet. Dies of this character wear necessarily in the actual use thereof, and the machine of my invention is a very satisfactory machine for duplicating worn out dies with their hollow contours accurately formed by the operation of the invention, under practical conditions of use.

When the work or die 3 is set in position, the saddle or carriage B may be moved to bring the grinding tool 10 to a point ready for entering the hollow portion of the die 3. Thereupon the movement of the tool 10 is effected by the manipulation of the screw operating handle 11 for carrying the tool gradually into the die 3 as the latter is rotated at high speed by the spindle 2.

As the tool 10 enters the die or work 3, the ground contour conforms of course with the contour established by the cooperation between the tracer arm or fingers 13 and the templet 14.

In the longitudinal movement of the slide 8 carrying the grinding tool 10 by means of the handle 11 the said slide 8 is forced in the direction of the block 15 by a spring 16 interposed between the side of the slide 8 opposite that carrying the tracer arm 13, and a stationary vertical abutment 17. The spring 16 of course tends to force the tracer member 13 into contact with the cam or templet 14 and maintain such contact for the accurate contouring grinding operation of the tool 10.

For limiting the direction of movement of the slide 8 toward the templet 14 I provide a vertical stop 18 projecting upwardly from the upper surface of the main slide 6. The abutment 17 is carried directly by the secondary longitudinally moving slide 7 which is operable by the handle 11.

At the right hand side of the machine, as seen in Figure 1, is located a vertical standard 19 attached to the saddle A of the machine, and from which laterally projects the dressing or diamond stick 20. This member 20 is disposed laterally of the space intermediate the slide 8 and the spindle 2. By movement of the grinding attachment 9, including the shaft carrying the grinding wheel 10, incident to adjustment of the saddle and supported cross and longitudinal slides, the wheel 10 may be caused to cooperate with the dressing stick 20 whenever this operation is desired to dress the grinding wheel surface.

The modified form of grinding wheel 21 shown in Figure 3 is provided when the interior dimensions of the work to be ground are very small. In the position shown in this figure the grinding wheel has been manipulated to reform the original contour to be ground. It is desirable to form the contour on the wheel, the same as that of the work to be ground, and, in order to avail of the templet 14 for this purpose, the standard 19, from which the dressing stick 20 projects, is moved from its position on the saddle A and placed in the square opening 22 (see Figure 2) and firmly fixed therein by the set screw 23.

Thus, when the wheel 21 has become slightly worn in use, by manipulating the slides 6 and 7 previously described, the tracer finger 13, being in contact with the templet 14, will cause the wheel 21 to be moved to the left, for example, in Figure 3, and, since the wheel is being rotated, the templet contour will be imparted thereto.

From the foregoing it is notable that the same templet 14 may be used to control the grinding action of either of the wheels 10 or 21, and the desired contour may be maintained on the wheel 21.

Having thus described my invention, what I claim as new and desire to secure by Letters Patent of the United States is:

1. In a grinding machine of the class described, a lathe bed, a headstock thereon, a driving spindle carried by the headstock and adapted to support the work to be ground, a saddle movable toward and from the headstock and mounted upon the lathe bed, a main cross slide mounted on the saddle and movable transversely thereof, a longitudinally movable slide mounted upon said main slide, a cross slide transversely movable and mounted upon said longitudinally movable slide, holding means for a grinder carried by said last mentioned cross slide, a grinding tool on said holding means, a tracer arm projecting from said last mentioned cross slide, a templet mounted upon the main cross slide aforesaid and arranged for contour controlling contact with said tracer arm, and means normally tending to move the cross slide supporting the grinding tool toward the templet for maintaining said contour controlling contact between the templet and the tracer arm.

2. A grinding machine as claimed in claim 1, wherein the means for moving the cross slide in the direction of the templet as specified, and a stop is carried by the main cross slide for limiting the extent of movement of the tool supporting cross slide toward the templet, comprises an abutment mounted upon the longitudinally movable slide carried on the main cross slide, and a spring interposed between said abutment and the cross slide carried by said longitudinal slide.

CHARLES J. CLARK.